US012568429B2

(12) United States Patent
Mysore Viswanath et al.

(10) Patent No.: US 12,568,429 B2
(45) Date of Patent: Mar. 3, 2026

(54) ENHANCEMENTS FOR USER EQUIPMENT NETWORK SLICE MANAGEMENT

(71) Applicant: Apple Inc., Cupertino, CA (US)

(72) Inventors: Vinay Mysore Viswanath, San Diego, CA (US); Vijay Venkataraman, San Jose, CA (US); Vivek G. Gupta, San Jose, CA (US)

(73) Assignee: Apple Inc., Cupertino, CA (US)

( * ) Notice: Subject to any disclaimer, the term of this patent is extended or adjusted under 35 U.S.C. 154(b) by 536 days.

(21) Appl. No.: 18/046,592

(22) Filed: Oct. 14, 2022

(65) Prior Publication Data

US 2023/0138108 A1    May 4, 2023

Related U.S. Application Data

(60) Provisional application No. 63/263,412, filed on Nov. 2, 2021.

(51) Int. Cl.
| | |
|---|---|
| *H04W 48/18* | (2009.01) |
| *H04W 48/14* | (2009.01) |
| *H04W 48/16* | (2009.01) |
| *H04W 60/04* | (2009.01) |
| *H04W 84/04* | (2009.01) |

(52) U.S. Cl.
CPC ........... *H04W 48/18* (2013.01); *H04W 48/14* (2013.01); *H04W 48/16* (2013.01); *H04W 60/04* (2013.01); *H04W 84/042* (2013.01)

(58) Field of Classification Search
CPC ..... H04W 48/14; H04W 48/16; H04W 48/18; H04W 60/04
See application file for complete search history.

(56) References Cited

U.S. PATENT DOCUMENTS

| | | |
|---|---|---|
| 2019/0029065 A1 | 1/2019 | Park et al. |
| 2019/0313236 A1 | 10/2019 | Lee et al. |
| 2020/0015158 A1 | 1/2020 | So |
| 2020/0322879 A1 | 10/2020 | Zhu et al. |
| 2021/0329539 A1 | 10/2021 | Surisetty et al. |

(Continued)

FOREIGN PATENT DOCUMENTS

| | | |
|---|---|---|
| CN | 110679185 | 1/2020 |
| CN | 111955031 | 11/2020 |

(Continued)

OTHER PUBLICATIONS

Nokia, "Impacts of network slicing subscription change indication to the current PLMN", 3GPP TSG-CT WG1 Meeting #120, C1-196324, Sep. 30, 2019, 4 sheets.

(Continued)

*Primary Examiner* — Wayne H Cai

(74) *Attorney, Agent, or Firm* — Fay Kaplun & Marcin, LLP

(57) ABSTRACT

A user equipment (UE) configured to transmit a registration request message to a network, the registration request message comprising a request to register to a set of one or more single-network slice selection assistance information (S-NSSAIs), receive a response to the registration request message, the response indicating that the request to register to the set of one or more S-NSSAIs is rejected and store the set of one or more S-NSSAIs in a rejected NSSAI list locally at the UE.

15 Claims, 7 Drawing Sheets

Signaling Diagram 600

UE 110 | AMF 205 | SMF 210

Identify that a desired network slice is not part of configured NSSAI 605

Configured NSSAI 610

Identify that the desired network slice is part of configured NSSAI but not part of allowed NSSAI 615

Trigger mobility registration update 620

REGISTRATION REQUEST message 625

REGISTRATION ACCEPT message 630

PDU session establishment request 635

PDU session establishment accept 640

(56)                    References Cited

U.S. PATENT DOCUMENTS

2023/0397092 A1*  12/2023  Kim ..................... H04W 48/02
2024/0397392 A1*  11/2024  Ishii ..................... H04W 36/08

FOREIGN PATENT DOCUMENTS

| | | |
|---|---|---|
| JP | 2021-166360 | 10/2021 |
| WO | 2021/136599 | 7/2021 |
| WO | 2021/201530 | 10/2021 |

OTHER PUBLICATIONS

3rd Generation Partnership Project, "Technical Specification Group Core Network and Terminals; Non-Access-Stratum (NAS) protocol for 5G System (5GS); Stage 3;" Release 17, V17.4.1, Sep. 27, 2021, 863 pages.
Apple, "NSSAI mapping during transfer of PDU session from HPLMN to VPLMN & VPLMN to HPLMN", 3GPP TSG-CT WG1 Meeting #131-e, C1-214542, Aug. 27, 2021, 24 sheets.
Sharp, "Handling of allowed NSSAI when the RA includes the TAI belonging to EPLMN", 3GPP TSG-CT WG1 Meeting #123-e, C1-202524, Apr. 24, 2020, 32 sheets.
Sharp, "Handling of rejected NSSAI for the current RA when the RA includes the TAI belonging to EPLMN", 3GPP TSG-CT WG1 Meeting #123-e, C1-202525, Apr. 24, 2020, 37 sheets.

* cited by examiner

Network Architecture 200

UE 110

Base Station 400

ENHANCEMENTS FOR USER EQUIPMENT NETWORK SLICE MANAGEMENT

PRIORITY CLAIM/INCORPORATION BY REFERENCE

This application claims priority to U.S. Provisional Application Ser. No. 63/263,412 filed on Nov. 2, 2021 and entitled, "Enhancements for User Equipment Network Slice Management," the entirety of which is incorporated herein by reference.

BACKGROUND

A user equipment (UE) may connect to a network that deploys multiple network slices. Generally, a network slice refers to an end-to-end logical network that is configured to provide a particular service and/or possess particular network characteristics. Each network slice may be isolated from one another but run on a shared network infrastructure. Thus, each network slice may share network resources but facilitate different functionality.

SUMMARY

Some exemplary embodiments are related to a method performed by a user equipment (UE). The method includes transmitting a registration request message to a network, the registration request message comprising a request to register to a set of one or more single-network slice selection assistance information (S-NSSAIs), receiving a response to the registration request message, the response indicating that the request to register to the set of one or more S-NSSAIs is rejected and storing the set of one or more S-NSSAIs in a rejected NSSAI list locally at the UE.

Other exemplary embodiments are related to a method performed by a user equipment (UE). The method includes registering to a first public land mobile network (PLMN), establishing a packet data unit (PDU) session on a first single-network slice selection assistance information (S-NS-SAI), the first S-NSSAI corresponding to the PLMN, registering to a second PLMN, receiving allowed NSSAI corresponding to the second PLMN, the allowed NSSAI comprising a second S-NSSAI, wherein the first S-NSSAI is mapped to the second S-NSSAI and updating the S-NSSAI associated with the PDU session from the first S-NSSAI to the second S-NSSAI.

Still further exemplary embodiments are related to a method performed by a user equipment (UE). The method includes registering to a first public land mobile network (PLMN), establishing a packet data unit (PDU) session on a first single-network slice selection assistance information (S-NSSAI), the first S-NSSAI corresponding to the VPLMN, registering to a home PLMN (HPLMN), receiving allowed NSSAI corresponding to the HPLMN, wherein the allowed NSSAI does not include a S-NSSAI matching the first S-NSSAI and releasing the PDU session unless a predetermined condition is satisfied.

Additional exemplary embodiments are related to a method performed by a user equipment (UE). The method includes registering to a home public land mobile network (HPLMN), receiving allowed network slice selection assistance information (NSSAI) for the HPLMN, receiving a tracking area identity (TAI) list containing TAIs belonging to the HPLMN, receiving a configuration update command (CUC) comprising an updated TAI list containing a TAI belonging to an equivalent PLMN (EPLMN) and storing the allowed NSSAI in an allowed NSSAI list for the EPLMN.

DETAILED DESCRIPTION

Figure 1:
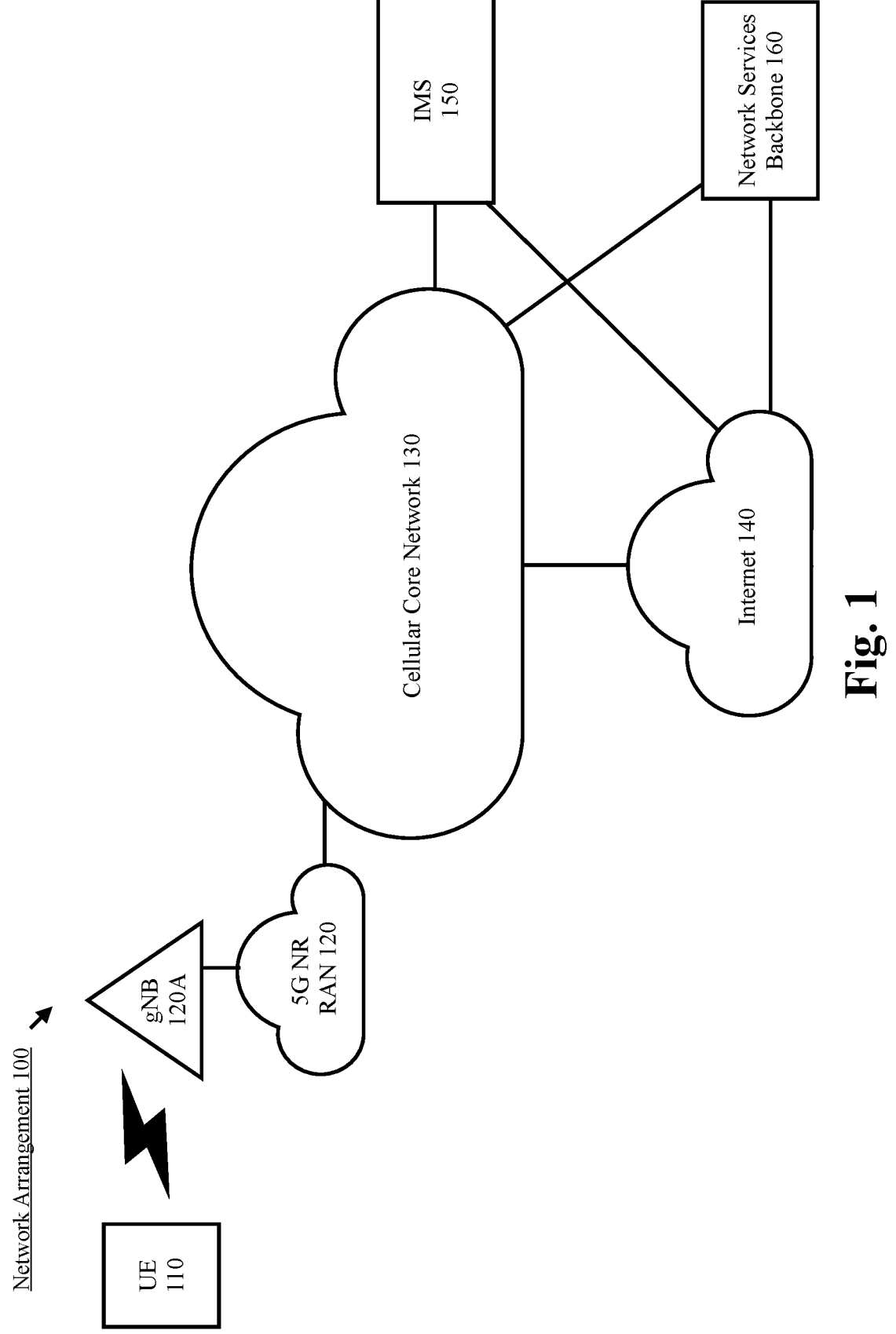
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments introduce various enhancements for network slicing. In one aspect, the exemplary embodiments relate to network slice access. In another aspect, the exemplary embodiments relate to how a user equipment (UE) manages rejected network slice selection assistance information (NSSAI). In a further aspect, the exemplary embodiments relate to NSSAI mapping. In another aspect, the exemplary embodiments relate to how the UE manages allowed NSSAI for an equivalent public land mobile network (EPLMN). Each of these exemplary aspects are described in detail below.

The exemplary embodiments are described with regard to a UE. However, the use of the term "UE" is merely for illustrative purposes. The exemplary embodiments may be utilized with any electronic component that may establish a connection with a network and is configured with the hardware, software, and/or firmware to exchange information and data with the network. Therefore, the UE as described herein is used to represent any suitable electronic component.

The exemplary embodiments are also described with regard to a fifth generation (5G) network that supports network slicing. Generally, network slicing refers to a network architecture in which multiple end-to-end logical networks run on a shared physical network infrastructure. Each network slice may be configured to provide a particular set of capabilities and/or characteristics. Thus, the physical infrastructure of the 5G network may be sliced into multiple virtual networks, each configured for a different purpose. Throughout this description, reference to a network slice may represent any type of end-to-end logical network that is configured to serve a particular purpose and implemented on the 5G physical infrastructure.

Those skilled in the art will understand that 5G may support a variety of different use cases, e.g., enhanced mobile broadband (eMBB), enhanced machine-type communication (eMTC), high-performance machine-type (HMTC), industrial Internet of things (IIoT), massive Internet of things (MIoT), ultra-reliable low-latency communication (URLLC), vehicle-to-everything (V2X), etc. Each type of use case may relate to various different types of applications and/or services. A network slice may be characterized by a type of use case, a type of application and/or service or the entity that provides the application and/or service via the network slice. In addition, an operator may deploy multiple network slices for different vertical applications and operator specific applications may use different network slices. However, any example in this description that characterizes a network slice in a specific manner is only provided for illustrative purposes. Throughout this description, reference to a network slice may represent any type of end-to-end logical network that is configured to serve a particular purpose and implemented on the 5G physical infrastructure.

A network slice may be identified by single network slice selection assistance information (S-NSSAI). Each instance of S-NSSAI may be associated with a public land mobile network (PLMN) and may include the slice service type (SST) and a slice descriptor (SD). The SST may identify the expected behavior of the corresponding network slice with regard to services, features and characteristics. Those skilled in the art will understand that the SST may be associated with a standardized SST value. The SD may identify any one or more entities associated with the network slice. For example, the SD may indicate an owner or an entity that manages the network slice (e.g., carrier) and/or the entity that the is providing the application/service via the network slice (e.g., a third-party, the entity that provides the application or service, etc.). In some embodiments, the same entity may own the network slice and provide the service (e.g., carrier services). Throughout this description, S-NS-SAI refers to a single network slice and the terms "NSSAI" or "S-NSSAIs" may be used interchangeably to refer to one or more network slices.

The UE may be configured to perform any of a wide variety of different tasks. Thus, the UE may be configured to utilize one or more network slices. To provide an example, the UE may utilize a first network slice for one or more carrier services (e.g., voice, multimedia messaging service (MMS), Internet, etc.) and a second different network slice for a third-party service. However, the configured purpose of a network slice is beyond the scope of the exemplary embodiments. The exemplary embodiments are not limited to any particular type of network slice.

The examples described herein may reference the terms "allowed NSSAI," "configured NSSAI," "requested NSSAI" and "rejected NSSAI." Prior to discussing the exemplary enhancements, a brief description of each these terms and how they may relate to one another is provided below.

Those skilled in the art will understand that the term "allowed NSSAI" refers to S-NSSAIs provided by the network that the UE may utilize in a serving PLMN for a particular registration area. As will be described in more detail below, the allowed NSSAI may be provided by the network to the UE during a registration procedure (e.g., a mobility registration update procedure or any other appropriate type of registration proecured). Due to the relationship between registration and allowed NSSAI, in some embodiments, the term "registered network slice" may be used interchangeably with allowed NSSAI to refer to the same concept.

To track the allowed NSSAI, the UE may operate an allowed NSSAI list stored locally at the UE or may utilize any other appropriate mechanism. The number of network slices that may be considered allowed NSSAI for the UE may be limited to a predetermined maximum number of allowed NSSAI. For example, 3GPP Specifications limit the maximum number of allowed NSSAI to a length of 8 S-NSSAI. However, the exemplary embodiments are not limited to the maximum number of allowed NSSAI being a length of 8 S-NSSAI and may apply to any appropriate maximum number of allowed NSSAI. In some scenarios, when a S-NSSAI is stored locally as an allowed NSSAI, the UE may attempt to establish a packet data unit (PDU) session on the S-NSSAI. However, when the S-NSSAI is not considered part of the allowed NSSAI, the UE may ignore upper layer requests for the S-NSSAI and PDU session establishment on the network slice may not be initiated by the UE.

Those skilled in the art will understand that the term "configured NSSAI" refers to S-NSSAIs provisioned in the UE and applicable to one or more PLMNs. To track the configured NSSAI, the UE may operate a configured NSSAI list stored locally at the UE or may utilize any other appropriate mechanism. When a network slice is stored locally as configured NSSAI, the value of the S-NSSAI is known to the UE. When a network slice is not stored locally as configured NSSAI, the UE may not know the value of the S-NSSAI. The number of configured NSSAI may be limited to a predetermined maximum number of configured NSSAI. For example, 3GPP Specifications limit the maximum number of configured NSSAI to a length of 16 S-NSSAI. However, the exemplary embodiments are not limited to the maximum number of configured NSSAI being a length of 16 S-NSSAI and may apply to any appropriate number. In some embodiments, the term "subscribed network slice" may be used interchangeably with configured NSSAI to refer to the same concept.

During operation, the number of configured NSSAI stored locally at the UE may be greater than the number of allowed NSSAI stored locally at the UE. Thus, there may be one or more S-NSSAIs considered by the UE to be configured NSSAI but not part of the allowed NSSAI. For example, S-NSSAI-A may be part of the configured NSSAI list stored locally at the UE but not part of the allowed NSSAI list stored locally at the UE. In this type of arrangement, the UE will not initiate PDU session establishment on S-NSSAI-A because S-NSSAI-A is not part of the allowed NSSAI list. Throughout this description, any reference to "S-NSSAI-A" is merely provided to differentiate one network slice from other network slices and is not intended to limit the exemplary embodiments in any way.

Those skilled in the art will understand that the term "requested NSSAI" refers to NSSAI provided to the network by the UE during a registration procedure. The network may then determine whether the UE is permitted to register to each requested S-NSSAI. For example, the UE may store S-NSSAI-A as part of the configured NSSAI. The UE may then transmit a registration request message to the network indicating that the UE wants to register to one or more network slices, e.g., S-NSSAI-A, etc. In response, the network may indicate that the requested S-NSSAI(s) is allowed NSSAI. The UE may then store the S-NSSAI-A in the allowed NSSAI list.

Alternatively, in response to the requested NSSAI, the network may indicate that the request for S-NSSAI-A is rejected. To provide some examples, the rejection may be due to a lack of available resources in a registration area or due to a failure to authenticate the UE's access to a particular network slice. The UE may then consider S-NSSAI-A to be "rejected NSSAI." To track rejected NSSAI, the UE may operate a rejected NSSAI list stored locally at the UE or may utilize any other appropriate mechanism. In some scenarios, the UE may be configured to omit or ignore rejected NSSAI during other operations and/or procedures. For example, under certain conditions, the UE cannot attempt to register on a network slice that is stored locally as part of the rejected NSSAI.

The above examples provide a general overview of the relationship between the terms "allowed NSSAI," "configured NSSAI," "requested NSSAI" and "rejected NSSAI." These examples are not intended to limit the scope of these terms or the exemplary embodiments in any way.

Some of the exemplary embodiments are described with regard to a scenario in which the UE wants to access a network slice that is not part of the allowed NSSAI. To provide one example, consider a scenario in which the UE is deployed within a PLMN and is to remain stationary for a relatively long duration of time. While deployed, an application may be downloaded on the UE that requires connectivity to S-NSSAI-A. However, S-NSSAI-A is not part of the allowed NSSAI. Due to the stationary behavior of the UE, the UE may not be triggered to initiate a registration procedure. As a result, the UE may be unable to gain access to a desired network slice (e.g., S-NSSAI-A) for an unreasonable amount of time.

Under conventional circumstances, like in the example provided above, the UE may not trigger a change to the allowed NSSAI despite the desired network slice not being part of the allowed NSSAI and the UE may not gain access to a desired network slice for an unreasonable amount of time. As will be described in more detail below, in one aspect, the exemplary embodiments introduce techniques that enable the UE to initiate a modification to the allowed NSSAI. These techniques may allow the UE to quickly gain access to a desired network slice even when the network slice is not part of the allowed NSSAI.

In another aspect, the exemplary embodiments relate to managing the rejected NSSAI stored locally at the UE. Typically, the UE does not register to network slices which are stored in the rejected NSSAI list. There are various conditions that may trigger the UE to remove a network slice from the rejected NSSAI list. However, it has been identified that under conventional circumstances, there may be scenarios in which the UE should be able to access a particular network slice that was previously rejected but nothing has triggered the UE to remove the network slice from the rejected NSSAI list. As a result, the UE may prevent itself from registering to a network slice that is actually available to the UE and the UE is allowed to use. As will be described in more detail below, the exemplary embodiments introduce techniques that enable the UE to remove entries from the rejected NSSAI stored locally at the UE.

In a further aspect, the exemplary embodiments relate to NSSAI mapping. Different PLMNs may interpret the same S-NSSAI value in a different manner. It has been identified that the UE does not adequately consider the mapping of S-NSSAIs during UE mobility from a home PLMN (HPLMN) to a visited PLMN (VPLMN) or vice versa. This may cause a misalignment between the UE and the network with regard to how the S-NSSAI value is interpreted which may lead to unpredictable behavior and a poor user experience by inadvertently deleting PDU sessions. Thus, S-NS-SAI values may need to be mapped across PLMNs to ensure that S-NSSAI values are adequately interpreted. As will be described in more detail below, the exemplary embodiments introduce techniques that are configured to improve the manner in which the UE manages the S-NSSAI mapping across different PLMNs.

In another aspect, the exemplary embodiments relate to the UE managing allowed NSSAI for an EPLMN. It has been identified that the UE does not adequately consider tracking area identities (TAI) belonging to different PLMNs when managing the allowed NSSAI. As will be described in more detail below, the exemplary embodiments introduce techniques that are configured to improve the manner in which the UE manages the allowed NSSAI for EPLMNs. Each of the exemplary enhancements described herein may be used in independently from one another, in conjunction with currently implemented network slicing mechanisms, future implementations of network slicing mechanisms or independently from other network slice slicing mechanisms. Specific examples of each of these exemplary enhancements are described in detail below.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long-term evolution (LTE) RAN, a legacy cellular network, a wireless local area network (WLAN), etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the 5G NR RAN 120.

The 5G NR RAN 120 may be a portion of a cellular network that may be deployed by a network carrier (e.g., Verizon, AT&T, T-Mobile, etc.). The 5G NR RAN 120 may include, for example, nodes, cells or base stations (e.g., Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station, e.g., the next generation Node B (gNB) 120A.

The network arrangement 100 also includes a cellular core network 130, the Internet 140, an IP Multimedia Subsystem (IMS) 150, and a network services backbone 160. The cellular core network 130 may refer an interconnected set of components that manages the operation and traffic of the cellular network. It may include the evolved packet core (EPC) and/or the fifth generation core (5GC).

The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
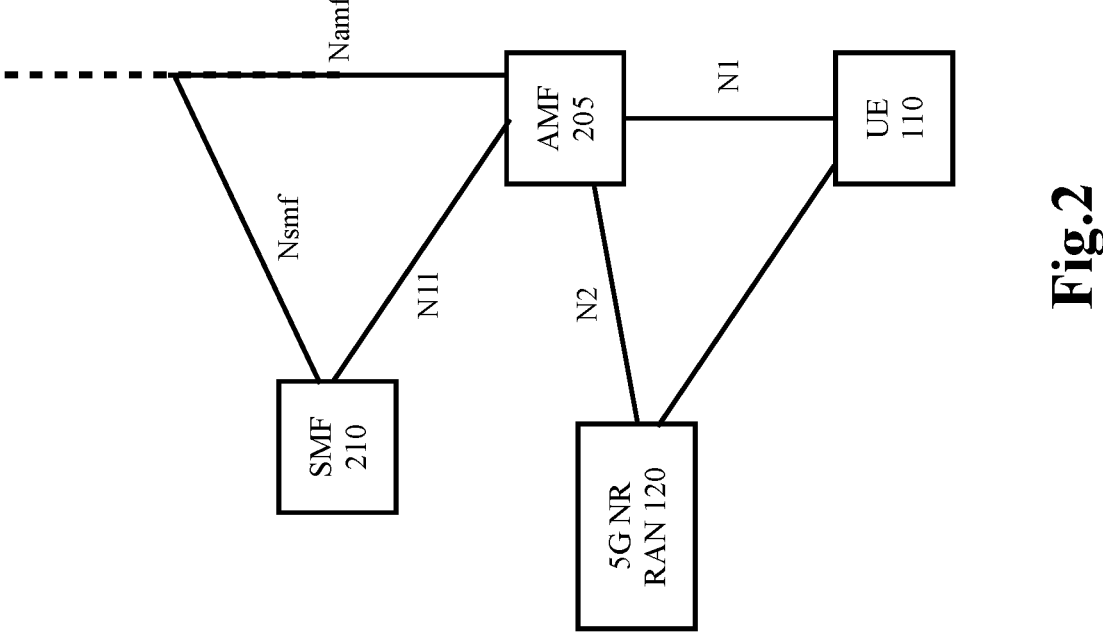
FIG. 2 shows an exemplary network architecture according to various exemplary embodiments.
Figure 2:

FIG. 2 shows an exemplary network architecture 200 according to various exemplary embodiments. The following description will provide a general overview of the various components of the exemplary architecture 200. The specific operations performed by the components with respect to the exemplary embodiments will be described in greater detail after the description of the architecture 200.

Those skilled in the art will understand that the components of the exemplary architecture 200 may reside in various physical and/or virtual locations relative to the network arrangement 100 of FIG. 1. These locations may include, within the access network (e.g., RAN 120), within the core network 130, as separate components outside of the locations described with respect to FIG. 1, etc.

In FIG. 2, the various components are shown as being connected via connections labeled Nx (e.g., N1, N2, N11). Those skilled in the art will understand that each of these connections (or interfaces) are defined in the 3GPP Specifications. The exemplary architecture 200 is using these connections in the manner in which they are defined in the 3GPP Specifications. Furthermore, while these interfaces are termed connections throughout this description, it should be understood that these interfaces are not required to be direct wired or wireless connections, e.g., the interfaces may communicate via intervening hardware and/or software components. To provide an example, the UE 110 may exchange signals over the air with the gNB 120A. However, in the architecture 200 the UE 110 is shown as having a connection to the AMF 205. This connection or interface is not a direct communication link between the UE 110 and the AMF 205, instead, it is a connection that is facilitated by intervening hardware and software components. Thus, throughout this description the terms "connection" and "interface" may be used interchangeably to describe the Nx interface between the various components.

The architecture 200 includes the UE 110 and the 5G NR RAN 120. The UE 110 and the 5G NR RAN 120 are connected to the access and mobility management function (AMF) 205. The AMF 205 is generally responsible for connection and mobility management in the 5G NR RAN 120. Those skilled in the art will understand that the AMF 205 is a control plane function and may perform operations related to registration management and connection management. For example, the AMF 205 may perform operations related to registration management between the UE 110 and the core network 130. The exemplary embodiments are not limited to an AMF that performs the above referenced operations. Those skilled in the art will understand the variety of different types of operations an AMF may perform. Further, reference to a single AMF 205 is merely for illustrative purposes, an actual network arrangement may include any appropriate number of AMFs.

The AMF 205 is connected to the session management function (SMF) 210. The SMF 210 may perform operations related to session management such as, but not limited to, session establishment, session release, IP address allocation, policy and QoS enforcement, etc. During operation, the UE 110 and the SMF 210 may exchange PDU session establishment requests and PDU session establishment responses. The exemplary embodiments are not limited to an SMF that performs the above referenced operations. Those skilled in the art will understand the variety of different types of operations a SMF may perform. Further, reference to a single SMF 210 is merely for illustrative purposes, an actual network arrangement may include any appropriate number of SMFs.

Figure 3:
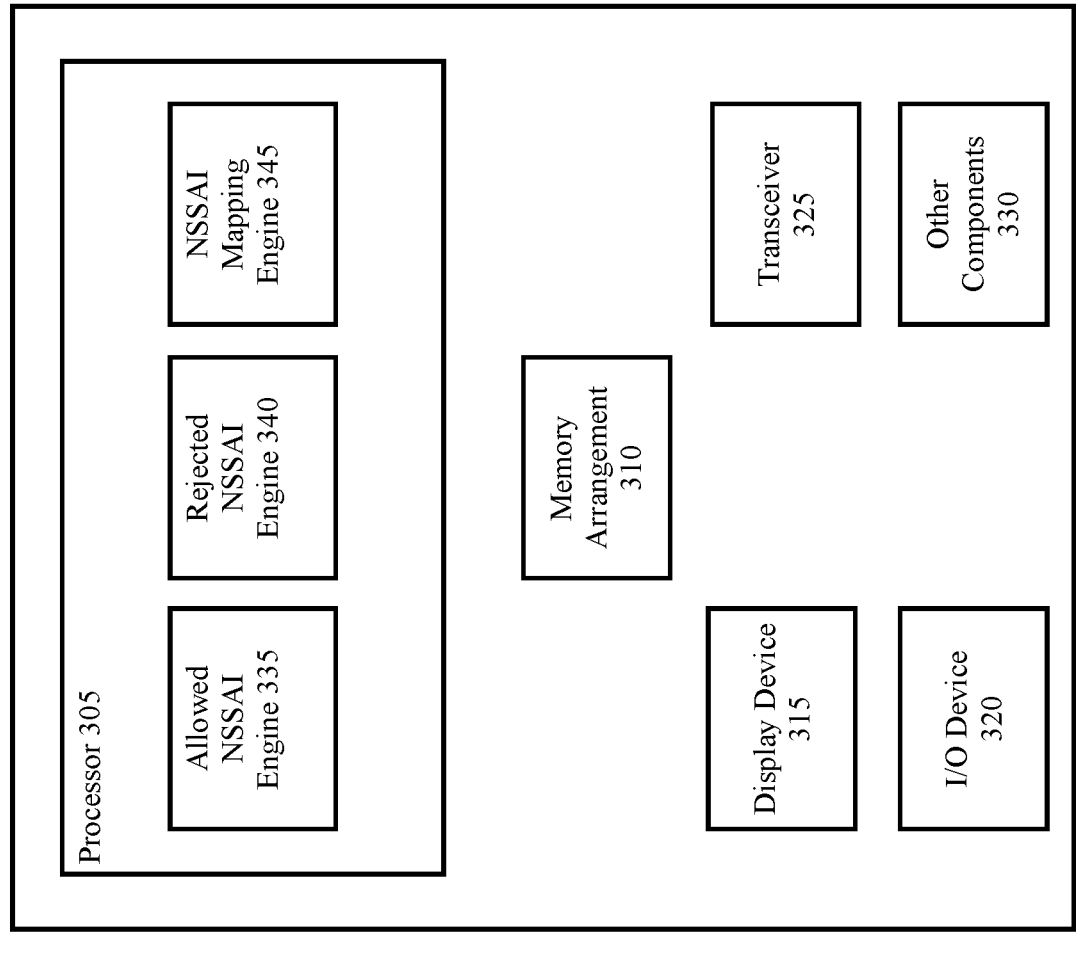
FIG. 3 shows an exemplary user equipment (UE) according to various exemplary embodiments.
Figure 3:

FIG. 3 shows an exemplary UE 110 according to various exemplary embodiments. The UE 110 will be described with regard to the network arrangement 100 of FIG. 1. The UE 110 may include a processor 305, a memory arrangement 310, a display device 315, an input/output (I/O) device 320, a transceiver 325 and other components 330. The other components 330 may include, for example, an audio input device, an audio output device, a power supply, a data acquisition device, ports to electrically connect the UE 110 to other electronic devices, etc.

The processor 305 may be configured to execute a plurality of engines of the UE 110. For example, the engines may include an allowed NSSAI engine 335, a rejected NSSAI engine 340 and a NSSAI mapping engine 345. The allowed NSSAI engine 335 may perform various operations related to managing allowed NSSAI stored locally at the UE 110 including, but not limited to, initiating a modification to the allowed NSSAI and managing allowed NSSAI for EPLMNs. The rejected NSSAI engine 340 may perform various operations related to managing the rejected NSSAI stored locally at the UE 110. The NSSAI mapping engine 345 may perform various operations related to tracking the NSSAI mapping across different PLMNs.

The above referenced engines 335-345 each being an application (e.g., a program) executed by the processor 305 is merely provided for illustrative purposes. The functionality associated with the engines 335-345 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 305 is split among two or more processors such as a baseband processor and an applications processor. The exemplary embodiments may be implemented in any of these or other configurations of a UE.

The memory arrangement 310 may be a hardware component configured to store data related to operations performed by the UE 110. The display device 315 may be a hardware component configured to show data to a user while the I/O device 320 may be a hardware component that enables the user to enter inputs. The display device 315 and the I/O device 320 may be separate components or integrated together such as a touchscreen. The transceiver 325 may be a hardware component configured to establish a connection with the 5G NR-RAN 120, an LTE-RAN (not pictured), a legacy RAN (not pictured), a WLAN (not pictured), etc. Accordingly, the transceiver 325 may operate on a variety of different frequencies or channels (e.g., set of consecutive frequencies).

Figure 4:
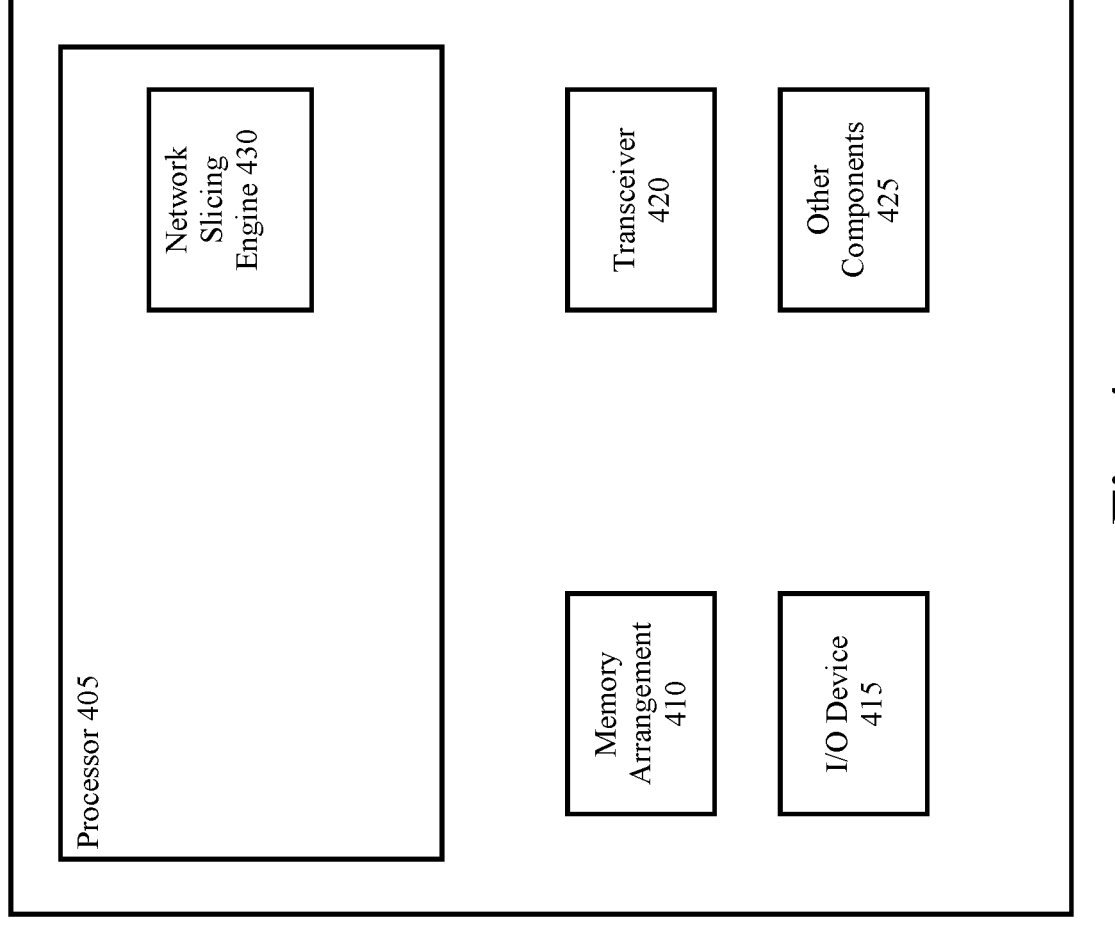
FIG. 4 shows an exemplary base station according to various exemplary embodiments.

FIG. 4 shows an exemplary base station 400 according to various exemplary embodiments. The base station 400 may represent the gNB 120A or any other access node through which the UE 110 may establish a connection and manage network operations.

The base station 400 may include a processor 405, a memory arrangement 410, an input/output (I/O) device 415, a transceiver 420, and other components 425. The other components 425 may include, for example, an audio input device, an audio output device, a battery, a data acquisition device, ports to electrically connect the base station 400 to other electronic devices, etc.

The processor 405 may be configured to execute a plurality of engines for the base station 400. For example, the engines may include a network slicing engine 430. The network slicing engine 430 may perform various operations related to enabling network slicing including, but not limited to, facilitating communication between the UE 110 and various network components (e.g., AMF 205, SMF 210, etc.).

The above noted engine 430 being an application (e.g., a program) executed by the processor 405 is only exemplary. The functionality associated with the engine 430 may also be represented as a separate incorporated component of the base station 400 or may be a modular component coupled to the base station 400, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory 410 may be a hardware component configured to store data related to operations performed by the base station 400. The I/O device 415 may be a hardware component or ports that enable a user to interact with the base station 400. The transceiver 420 may be a hardware component configured to exchange data with the UE 110 and any other UE in the system 100. The transceiver 420 may operate on a variety of different frequencies or channels (e.g., set of consecutive frequencies). Therefore, the transceiver 420 may include one or more components (e.g., radios) to enable the data exchange with the various networks and UEs.

During operation, for any of a variety of different reasons, the UE 110 may want to gain access to a network slice that is not part of the allowed NSSAI. To provide some examples, an application may be installed on the UE 110 or a specific feature may be activated by upper layers of the UE 110 that requires connectivity to a particular network slice. Under conventional circumstances, the UE 110 may be unable to gain access to the desired network slice for an unreasonable amount of time if the desired network slice is not part of the allowed NSSAI.

In one aspect, the exemplary embodiments introduce techniques that enable the UE to initiate a modification to the allowed NSSAI. The signaling diagram 500 shows an example of UE initiated allowed NSSAI modification where a desired network slice is part of the configured NSSAI but not part of the allowed NSSAI. The signaling diagram 600 shows an example of UE initiated allowed NSSAI modification where a desired network slice is not part of the configured NSSAI or the allowed NSSAI. These techniques may allow the UE 110 to quickly gain access to a desired network slice even when the network slice is not part of the allowed NSSAI.

Figure 5:
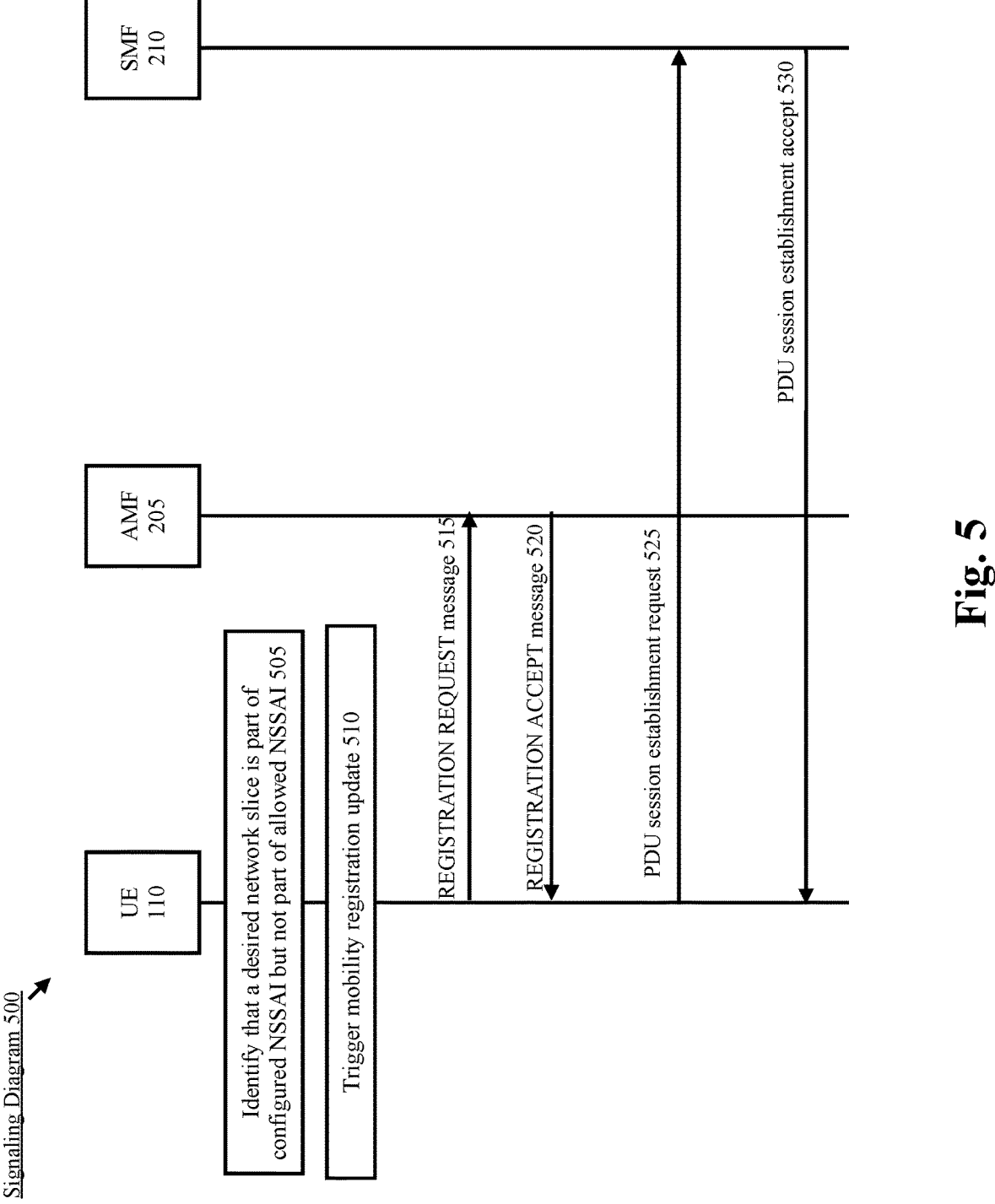
FIG. 5 shows a signaling diagram for UE initiated allowed network slice selection assistance information (NSSAI) modification according to various exemplary embodiments.

FIG. 5 shows a signaling diagram 500 for UE initiated allowed NSSAI modification according to various exemplary embodiments. The signaling diagram 500 includes the UE 110, the AMF 205 and the SMF 210. In some examples, when describing operations performed by the UE 110 reference may be made to an application processor and a baseband processor. However, these examples are not intended to limit the exemplary embodiments in any way. The UE 110 may perform the operations described herein using any appropriate combination of hardware, software and/or firmware.

In 505, the UE 110 identifies that a desired network slice (e.g., S-NSSAI-A) is part of configured NSSAI but not part of allowed NSSAI. To provide an example, consider a scenario in which the UE 110 is deployed within a PLMN and has already been provided allowed NSSAI by the network. The UE 110 has been provisioned with S-NSSAI-A and has stored it locally as configured NSSAI. However, at this time, S-NSSAI-A is not part of the allowed NSSAI. An application may then be installed on the UE 110 that maps to S-NSSAI-A. However, the exemplary embodiments are not limited to this type of scenario and the UE 110 may want to gain access to the desired network slice for any appropriate reason.

Continuing with the example provided above, in some embodiments, the application processor may determine that a new application has been installed that requires connectivity to S-NSSAI-A. The application processor may then send a request to the baseband processor for access to the desired S-NSSAI-A. The baseband processor may detect that the UE 110 is subscribed to S-NSSAI-A but not registered to S-NSSAI-A.

In 510, the UE 110 triggers a mobility registration update procedure to register to the desired network slice. As will be described in more detail below with regard to 515, the UE 110 may transmit a registration request message to the AMF 205 that includes requested NSSAI comprising the desired network slice (e.g., S-NSSAI-A) as part of the mobility registration update procedure.

The one or more trigger conditions for the mobility registration update procedure in 510 are configured to balance the functionality and/or user experience of the network slices on which the UE 110 is already registered and the desired network slice. As indicated above, one exemplary trigger condition for the mobility registration update procedure may include an upper layer (e.g., application processor) request for NSSAI that includes one or more S-NSSAI which are not present in the locally stored allowed NSSAI but are included as part of the locally stored configured NSSAI. In other words, the mobility registration update procedure may be triggered in response to detecting that the UE 110 is subscribed but not registered to one or more S-NSSAI corresponding to the application running on the UE 110.

The one or more trigger conditions may also include conditions related to the currently stored allowed NSSAI. One exemplary trigger condition may be a number of stored allowed NSSAI that is less than the predetermined maximum number of allowed NSSAI. Another exemplary trigger condition may be an allowed NSSAI list comprising S-NSSAI that does not include the S-NSSAI corresponding to a new application or feature as indicated in the upper layer request for NSSAI. When the currently registered network slices do not match the NSSAI requested by the upper layers, this may indicate that the UE 110 is maintaining a registration to a S-NSSAI that is unlikely to be utilized by the UE 110.

The one or more trigger conditions may also include a condition related to the 5G mobility management (5GMM) operating mode of the UE 110. Those skilled in the art will understand that the UE 110 may be configured in one of multiple different 5GMM operating modes. When the UE 110 is in 5GMM-CONNECTED mode, the UE 110 may not trigger the mobility registration update procedure to register to the desired network slice. However, when the UE 110 is in 5GMM-IDLE mode, the UE 110 may trigger the registration procedure to register the UE 110 to the desired network slice.

In 515, the UE 110 transmits a registration request message to the AMF 205. The registration request message may include requested NSSAI comprising the desired network slice (e.g., S-NSSAI-A). In 520, the AMF 205 transmits a registration accept message to the UE 110. The registration accept message may include allowed NSSAI comprising the desired network slice S-NSSAI-A. At this time, the UE 110 is now registered to S-NSSAI-A and may establish a PDU session on this network slice. Thus, in 525, the UE 110 transmits a PDU session establishment request to the SMF 210 to establish a PDU session on network slice S-NSSAI-A.

Continuing with the example described above, in some embodiments, the baseband processor may send an updated allowed NSSAI list to the application processor. The application processor may then detect that the S-NSSAI-A is available for the corresponding application and send a request to the baseband processor to establish a data call with a remote server on S-NSSAI-A.

In 530, the SMF 210 transmits a registration accept message to the UE 110 indicating that the PDU session has been established on the network slice S-NSSAI-A. However, the PDU session establishment procedure referenced above is merely provided for illustrative purposes. The exemplary enhancements described in the signaling diagram 500 are directed towards modifying the allowed NSSAI and what happens after the UE 110 is registered to the desired network slice is beyond the scope of the exemplary embodiments.

Figure 6:
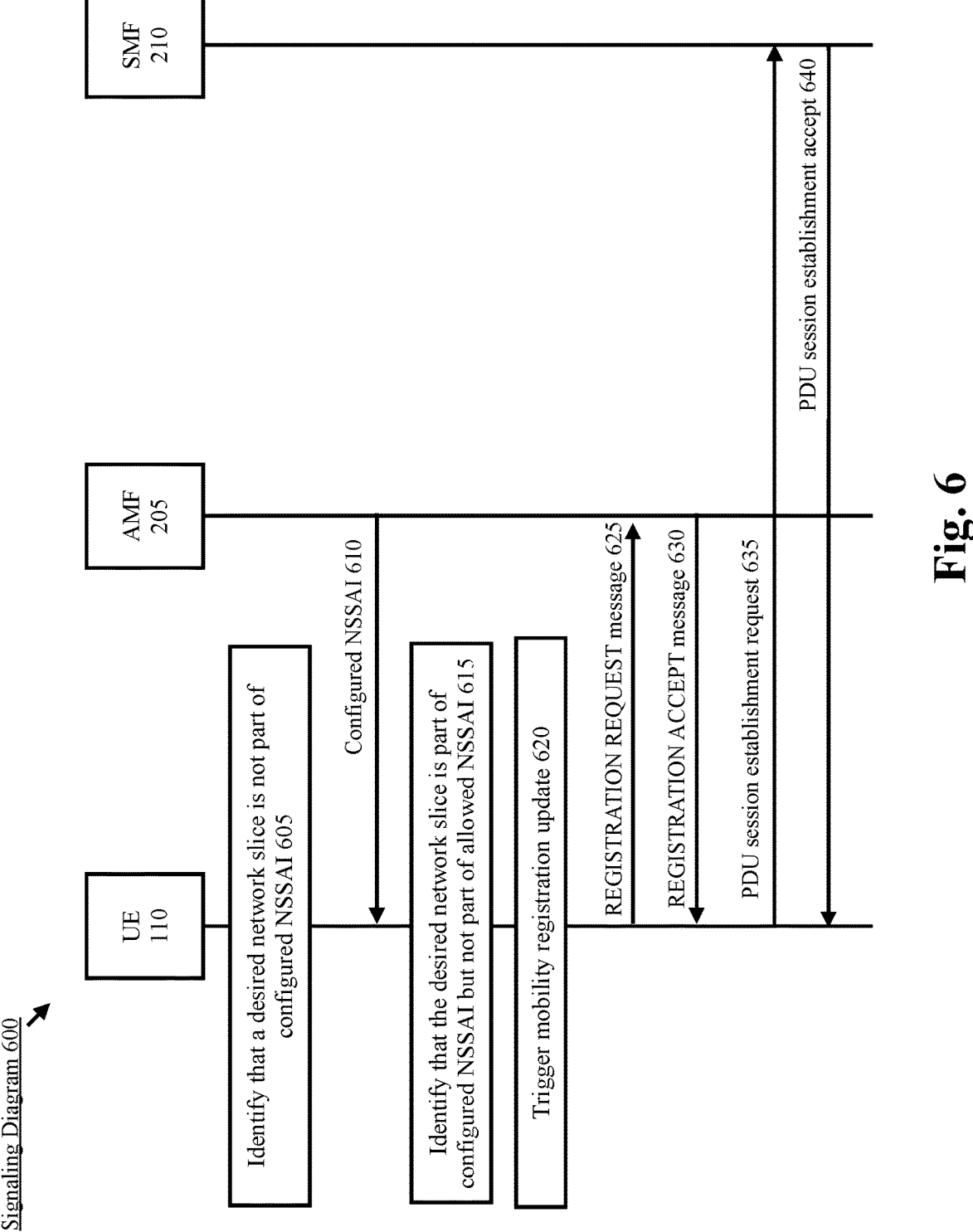
FIG. 6 shows a signaling diagram for UE initiated allowed NSSAI modification according to various exemplary embodiments.

FIG. 6 shows a signaling diagram 600 for UE initiated allowed NSSAI modification according to various exemplary embodiments. The signaling diagram 600 includes the UE 110, the AMF 205 and the SMF 210. In some examples, when describing operations performed by the UE 110, reference may be made to an application processor and a baseband processor. However, these examples are not intended to limit the exemplary embodiments in any way. The UE 110 may perform the operations described herein using any appropriate combination of hardware, software and/or firmware.

In 605, the UE 110 identifies that a desired network slice (e.g., S-NSSAI-A) is not part of configured NSSAI. To provide an example, consider a scenario in which the UE 110 is deployed within a PLMN, has been provisioned with configured NSSAI and provided allowed NSSAI by the network. However, the UE 110 has not been provisioned with S-NSSAI-A. An application is then installed on the UE 110 that maps to a S-NSSAI-A, however, S-NSSAI-A is not part of the configured NSSAI for the UE 110. The exemplary embodiments are not limited to this type of scenario and the UE 110 may want to gain access to the desired network slice for any appropriate reason.

Continuing with the example described above, in some embodiments, the application processor may determine that a new application has been installed that requires connectivity to S-NSSAI-A. The application processor may then send a request to the baseband processor for access to the desired S-NSSAI-A. The baseband processor may then detect that the UE 110 is not subscribed to S-NSSAI-A.

In 610, the AMF 205 transmits configured NSSAI to the UE 110 comprising the desired network slice (e.g., S-NSSAI-A). The AMF 205 may transmit the configured NSSAI to the UE 110 in response to an explicit request by the UE 110 or in response to other conditions experienced by the UE 110 and/or the network. In one example, the UE 110 performs initial registration with a NR network to receive the configured NSSAI. In another example, the UE receives the new configured NSSAI due to a handover from an LTE radio access technology (RAT) to a 5G NR RAT. In another example, in response to the user subscribing to the desired network slice, the network sends the new configured NSSAI in a registration accept message or a configuration update command (CUC). However, the exemplary embodiments are not limited to these examples and the UE 110 may receive configured NSSAI in any appropriate manner.

In 615, the UE 110 identifies that the desired network slice (e.g., S-NSSAI-A) is part of configured NSSAI but not part of allowed NSSAI. In 620, the UE 110 triggers a mobility registration update procedure to register to the desired network slice. As will be described in more detail below with regard to 625, the UE 110 may transmit a registration request message to the AMF 205 that includes requested NSSAI comprising the desired network slice (e.g., S-NSSAI-A) as part of the registration procedure.

The one or more trigger conditions for the mobility registration update procedure in 620 are configured to balance the functionality and/or user experience of the currently registered network slices and the desired network slice. As indicated above, one exemplary trigger condition for the mobility registration update procedure may include receiving a S-NSSAI in configured NSSAI from the network that was previously requested by upper layers (e.g., the application processor). In other words, the mobility registration update procedure may be triggered in response detecting that the UE 110 is now subscribed to a network slice that was previously requested by upper layers.

The one or more trigger conditions may also include conditions related to the currently stored allowed NSSAI. One exemplary trigger condition may be a number of stored allowed NSSAI that is less than the predetermined maximum number of allowed NSSAI. Another exemplary trigger condition may be an allowed NSSAI list comprising S-NSSAI that are not included in the upper layer request for NSSAI.

The one or more trigger conditions may also include a condition related to the 5GMM operating mode of the UE 110. When the UE 110 is in 5GMM-CONNECTED mode, the UE 110 may not trigger the mobility registration update procedure to register to the desired network slice. However, when the UE 110 is in 5GMM-IDLE mode, the UE 110 may trigger the registration procedure to register the UE 110 to the desired network slice.

In 625, the UE 110 transmits a registration request message to the AMF 205. The registration request message may include requested NSSAI comprising the desired network slice (e.g., S-NSSAI-A). In 630, the AMF 205 transmits a registration accept message to the UE 110. The registration accept message may include allowed NSSAI comprising the desired network slice S-NSSAI-A. At this time, the UE 110 is now registered to S-NSSAI-A and may establish a PDU session on this network slice. Thus, in 635, the UE 110 transmits a PDU session establishment request to the SMF 210 to establish a PDU session network slice S-NSSAI.

Continuing with the example described above, in some embodiments, the baseband processor may send an updated allowed NSSAI list to the application processor. The application processor may then detect that the S-NSSAI-A is available for the corresponding application and send a request to the baseband processor to establish a data call with a remote server on S-NSSAI-A.

In 640, the SMF 210 transmits a registration accept message to the UE 110 indicating that the PDU session has been established on the network slice S-NSSAI-A. However, the PDU session establishment procedure referenced above is merely provided for illustrative purposes. The exemplary enhancements described in the signaling diagram 600 are directed towards modifying the allowed NSSAI and what happens after the UE 110 is registered to the desired network slice is beyond the scope of the exemplary embodiments.

As mentioned above, one of the trigger conditions for the UE initiated allowed NSSAI medication may be 5GMM-IDLE mode. For example, the UE 110 may initiate a mobility registration update procedure in 5GMM-IDLE mode to register to a new list of NSSAI based on i) changes in network slices requested by upper layers due to policies and/or ii) updated configured NSSAI list received by the UE 110 as part of a configuration update command (CUC) or a registration accept message.

In some embodiments, for initial registrations accepted by the network, if the registration accept message contains the network slicing indication IE with the network slicing subscription change indication set to "network slicing subscription changed," or contains a configured NSSAI IE with a new configured NSSAI for the current PLMN, the UE 110 may wait until it enters 5GMM-IDLE mode and then the UE 110 may initiate the mobility registration update procedure to register to a new set of NSSAI based on new configured NSSAI.

In some embodiments, for mobility registration update accepted by the network, if a new configured NSSAI for the current PLMN is included, the AMF 205 may also include the mapped S-NSSAIs for the configured NSSAI for the current PLMN if available in the registration accept message and the UE 110 may wait until it enters 5GMM-IDLE mode and the UE 110 may initiate a registration procedure for mobility registration update to register to a new set of NSSAI based on the new configured NSSAI.

In some embodiments, the trigger conditions for the mobility registration update procedure may also include the status of a 5G system (5GS) mobility management timer. In this example, the timer is referred to as "T3540" which is defined in various 3GPP Specifications. The exemplary embodiments introduce techniques for utilizing this timer for the exemplary UE initiated allowed NSSAI modification procedure. However, the exemplary embodiments are not limited to the T3540 timer and may introduce a new timer for this purpose or utilize any other appropriate mechanism.

In one example, if the UE 110 receives a Configuration Updated Command (CUC) message that does not indicate "registration requested" in the registration requested bit of the configuration update indication IE, the UE 110 may start T3540. Upon expiry of T3540 (and zero or more other trigger conditions), the UE 110 may initiate mobility registration update procedure to register to network slices based on the new configured NSSAI. For example, within the context of the signaling diagram 600, the UE 110 may receive the CUC message in 610 and start T3540. In 620, the UE 110 may trigger the mobility registration update procedure based, at least in part, on the expiry of T3540.

The timer T3540 may also be utilized to release the N1 non-access stratum (NAS) signaling connection. In some embodiments, the start of T3540 may be triggered if i) the CUC message that does not indicate "registration requested" in the registration requested bit of the configuration update indication IE, ii) the user-plane resources for PDU sessions have not been set up and/or iii) no emergency PDU session has been established.

After the start of T3540, the UE 110 may be triggered to stop the timer and perform a particular operation. For example, upon an indication from the lower layers that the access stratum connection has been released, the UE 110 may stop T3540 and perform a new registration procedure. In another example, upon an indication from lower layers that the user-plane resources for PDU sessions are set up, the UE may stop T3540 and may send user data via the user plane. In this scenario, the new registration procedure may be performed when the UE 110 moves to 5GMM-IDLE mode. In another example, upon receiving a request from the upper layers to perform emergency services fallback when the UE 110 is configured with 3GPP access or establish an emergency PDU session, the UE 110 may stop T3540 and locally release the N1 NAS signaling connection.

In the signaling diagrams 500-600, the UE 110 does not have to wait for the network or mobility conditions to trigger network slice registration for the desired network slice. Instead, the exemplary embodiments provide fast access to the desired network slice by enabling the UE 110 to initiate modification to the allowed NSSAI when the UE 110 wants to access a network slice that is not part of the allowed NSSAI.

In another aspect, the exemplary embodiments relate to the UE 110 managing rejected NSSAI. As indicated above, a requested network slice may be rejected by the AMF 205 during a registration procedure. For example, the AMF 205 may transmit a message comprising a rejection cause code in response to a requested S-NSSAI. The rejection cause code may indicate the reason for the rejection, e.g., the S-NSSAI is not available in the current PLMN, the S-NSSAI is not available in current registration area, etc.

The UE 110 may operate a rejected NSSAI list stored locally at the UE 110. Typically, the UE 110 cannot register to a network slice if the S-NSSAI is stored as part of the rejected NSSAI list. For example, the UE 110 may ignore or omit S-NSSAI requested by upper layers for subsequent operations if the S-NSSAI is part of the rejected NSSAI list.

The UE 110 may not register on a network slice stored in the rejected NSSAI list until the network slice is deleted from the rejected NSSAI list. Under conventional circumstances, the UE 110 may not delete a S-NSSAI from the rejected NSSAI list in a timely manner. This may create a scenario where S-NSSAI-A was rejected by the network during a registration procedure but since then conditions have changed and the cause of the rejection is no longer true. In this type of scenario, the UE 110 should be able to access the network slice but since nothing has triggered the UE 110 to delete the S-NSSAI from the rejected NSSAI list, the UE 110 continues to behave as if the network slice is not available. As will be described in more detail below, the exemplary embodiments introduce techniques for handling rejected NSSAI that allows the UE 110 to avoid the types of scenarios described above which may occur under conventional circumstances.

Figure 7:
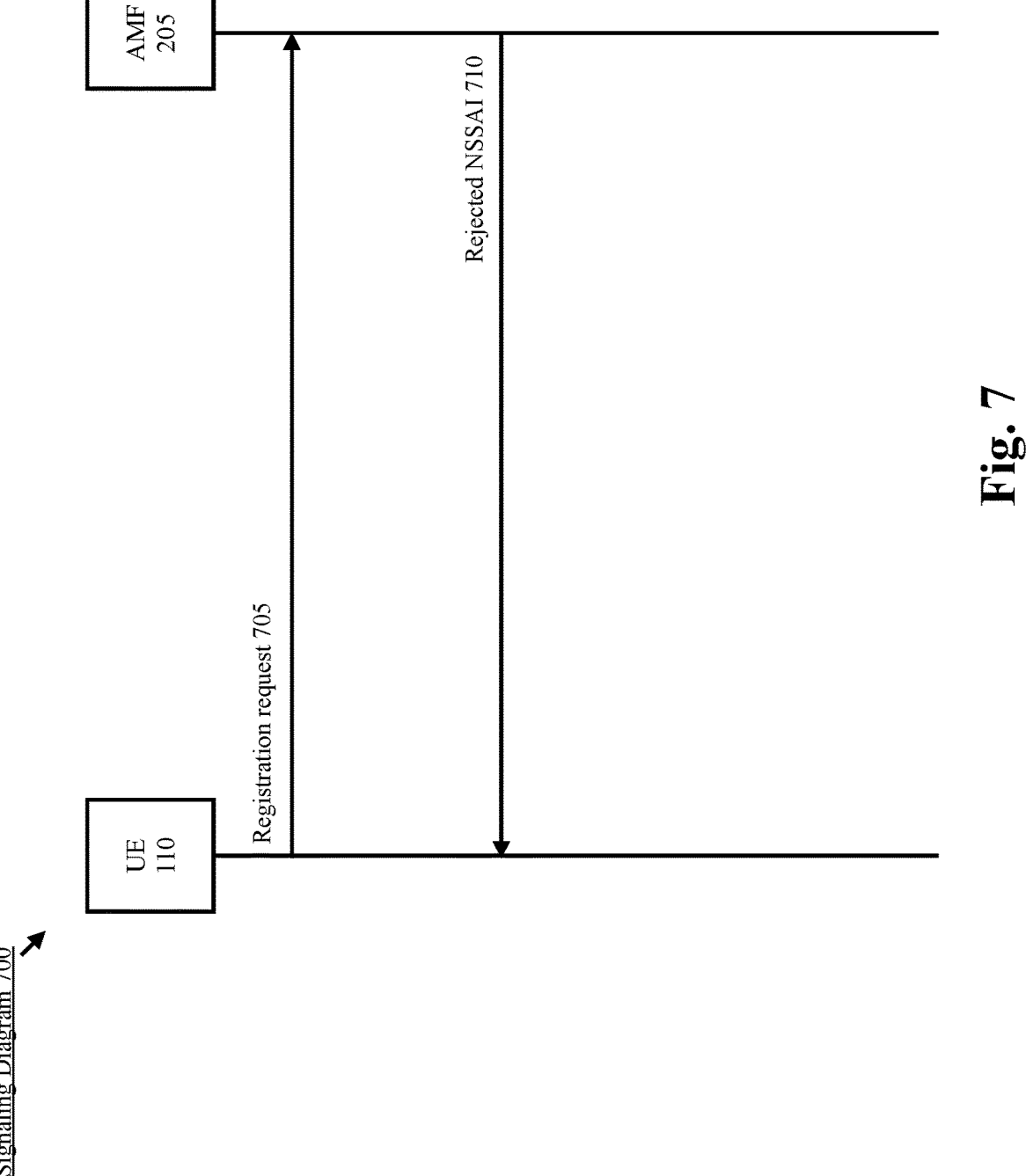
FIG. 7 shows a signaling diagram for S-NSSAI rejection according to various exemplary embodiments.

FIG. 7 shows a signaling diagram 700 for S-NSSAI rejection according to various exemplary embodiments. The signaling diagram 700 includes the UE 110 and the AMF 205. The signaling diagram 700 will provide a general overview of network slice rejection and be used to provide context for the exemplary enhancements for managing rejected NSSAI at the UE 110. In this example, reference to PLMN_1 and S-NSSAI-A are not intended to limit the exemplary embodiments in any way. Instead, PLMN_1 is used to differentiate one PLMN from other PLMNs. Similarly, S-NSSAI-A is used to differentiate one S-NSSAI from other S-NSSAIs.

In 705, the UE 110 transmits a registration request message to the AMF 205. The registration request message may include requested NSSAI comprising, at least, S-NSSAI-A.

In 710, the AMF 205 transmits a response to the registration request message (e.g., registration accept, registration reject, etc.) including an indication of a rejected network slice. For example, the response may include a rejection cause code associated with S-NSSAI-A indicating why the network did not accept the UE 110 registration request for S-NSSAI-A. To provide some examples, the rejection cause code may indicate that the S-NSSAI is not available in the current PLMN or that the S-NSSAI is not available in current registration area. In other examples, the rejection cause code may indicate that a network slice quota has been reached. However, these examples are merely provided for illustrative purposes, the basis on which the network rejected a network slice is beyond the scope of the exemplary embodiments.

One of the exemplary techniques relates to a scenario where the UE 110 is registered in PLMN_1 and has a rejected NSSAI list for PLMN_1. For example, the UE 110 may receive the rejected NSSAI for PLMN_1 in 710 of the signaling diagram 700. The UE 110 also receives a network slicing indication IE with the network slicing subscription change indication set to "network slicing subscription changed" in a registration accept message or a CUC message. In response, the UE 110 may be triggered to perform mobility registration on PLMN_1.

On the network side, a change to the UE 110 subscription information may be detected. The change may indicate that the UE 110 is now permitted to access a previously rejected network slice (e.g., S-NSSAI-A). However, under conventional circumstances, the UE 110 may not be triggered to delete the rejected NSSAI list for the current PLMN (e.g., PLMN_1). In addition, there may be no direct mechanism by which the network can ask the UE 110 to delete rejected NSSAI. As a result, even though the UE 110 should be able to access S-NSSAI-A because the network slice is no longer considered rejected NSSAI on the network side, the UE 110 may still be unable to access the network slice because the network slice has not been removed from the rejected NSSAI list.

The exemplary embodiments introduce a technique where the UE 110 deletes rejected NSSAI (if present), when the UE 110 receives an indication of a change in subscription information from the network. To provide an example, when the UE 110 receives a network slicing indication IE with the network slicing subscription change indication set to "network slicing subscription changed" in a registration accept message or in a CUC message, the UE 110 may delete the network slicing information for each of the PLMNs that the UE 110 has slicing information stored (excluding the current PLMN) and the UE 110 may also delete any rejected NSSAI (if present).

Another exemplary technique relates to a scenario where the UE 110 is registered to PLMN_1 and has a rejected NSSAI list for PLMN_1. For example, the UE 110 may receive the rejected NSSAI for PLMN_1 in 710 of the signaling diagram 700. The UE 110 also performs an inter- RAT (IRAT) transition from N1 mode to S1 mode and remains in a 5GMM-registered state. Those skilled in the art will understand that N1 mode is a mode of the UE 110 allowing access to the 5G core network via the 5G access network and S1 mode is a mode in which the UE 110 applies to both 5G system (5GS) and evolved packet system (EPS). Due to a change in user subscription, one or more network slices stored in the rejected NSSAI list for PLMN_1 are no longer considered as rejected NSSAI by the 5GS network. In response, the UE 110 performs IRAT transition to move to N1 mode and triggers mobility registration.

On the network side, a change to the UE 110 subscription information may be detected. The change may indicate that the UE 110 is now permitted to access a previously rejected network slice (e.g., S-NSSAI-A). Under conventional circumstances, the UE 110 may not delete rejected NSSAI for PLMN_1 upon the IRAT transition to S1 mode and thus, the UE 110 may not include rejected NSSAI upon the IRAT transition to N1 mode. As a result, the UE 110 may not obtain access to the network slices which were previously rejected but have now been removed from rejected NSSAI by the network.

The exemplary embodiments introduce a technique where when the UE 110 performs an IRAT transition from N1 mode to S1 mode and the UE 110 is not registered with the current PLMN over another access, the rejected NSSAI for the current PLMN and the rejected NSSAI for the failed or revoked network slice specific authentication and authorization (NSSAA) shall be deleted by the UE 110. In another technique, when the UE 110 performs an IRAT transition from N1 to S1 mode, the rejected NSSAI for the current registration area corresponding to the access type shall be deleted by the UE 110.

Another exemplary technique relates to a scenario where the UE 110 is registered in PLMN_1 and has rejected NSSAI list for PLMN_1. For example, the UE 110 may receive the rejected NSSAI for PLMN_1 in 710 of the signaling diagram 700. The UE 110 also receives a CUC message with a registration requested bit of the configuration update indication IE set to "registration requested" and contain no other parameters. In response, the UE 110 may trigger mobility registration on PLMN_1.

There may be changes to the allowed NSSAI on the network side. Under conventional circumstances, the UE 110 may not delete rejected NSSAI for the current PLMN and the UE 110 may be expected to delete allowed NSSAI. However, in the above scenario, the UE 110 may not use the rejected NSSAI for subsequent registration which may result in the user not having access to the slices despite changes to the allowed NSSAI on the network side.

The exemplary embodiments introduce a technique where the UE 110 may delete rejected NSSAI if the UE 110 receives a CUC message with a registration requested bit of the configuration update indication IE set to "registration requested" and contains no other parameters.

Another exemplary technique relates to two different scenarios. In one scenario, the UE 110 is registered in PLMN_1 and has a rejected NSSAI list for PLMN_1. For example, the UE 110 may receive the rejected NSSAI for PLMN_1 in 710 of the signaling diagram 700. The UE 110 then attempts to perform mobility registration on a different PLMN (e.g., PLMN_2) and receives a registration reject message with a cause code #62 (e.g., no network slices available) and a rejected NSSAI list for PLMN_2. The UE 110 remains in the 5GMM-registered state.

In the above example scenario, the UE 110 may be expected to delete rejected NSSAI upon deregistering following unsuccessful registration in a new PLMN. However, under conventional circumstances, the UE 110 may not delete the rejected NSSAI and may retain rejected NSSAI for PLMN_1 and rejected NSSAI for PLMN_2.

In a second scenario, the UE 110 is registered in PLMN_1 and receives rejection cause code #62 with rejected NSSAI containing all the network slices rejected for PLMN_1. The UE 110 may not have any other network slice to register to and the UE 110 may disable N1 mode when cause code #62 is received on the current PLMN. In response, the UE 110 performs an IRAT transition to S1 mode.

In the above example scenario, the UE 110 is expected to delete rejected NSSAI upon deregistering following unsuccessful registration in the current PLMN for 5GMM causes other than cause code #62. However, in the above scenario, the UE 110 does not delete rejected NSSAI and may retain rejected NSSAI for PLMN_1.

The exemplary embodiments introduce a technique for NSSAI storage where when the UE 110 enters 5GMM-deregistered state following an unsuccessful registration for 5GMM causes other than cause code #62 (e.g., no network slices available) for the current PLMN unless N1 mode is disabled as part of handling cause code #62, the UE 110 may delete the rejected NSSAI for the current PLMN and the rejected NSSAI for the failed or revoked NSSAA. In another technique, when the UE 110 enters 5GMM-deregistered state or 5GMM-registered state following an unsuccessful registration with a new PLMN, the UE 110 may delete the rejected NSSAI for the current PLMN and the rejected NSSAI for the failed or revoked NSSAA.

In another aspect, the exemplary embodiments relate to NSSAI mapping. NSSAIs with similar functionality can have different values across PLMNS. Each S-NSSAI in the HPLMN is mapped to the corresponding S-NSSAI in a VPLMN deepening on the VPLMN operator's policy and configuration. It has been identified that the UE 110 may not adequately consider NSSAI mapping during UE mobility from a HPLMN to a VPLMN or vice versa. This may cause a misalignment between the UE and the network which may lead to unpredictable behavior (e.g., releasing PDU sessions, etc.) and a poor user experience.

To provide an example, consider a scenario where the UE 110 is registered on a HPLMN and has a PDU session ongoing with S-NSSAI-A and no corresponding mapped S-NSSAI. The UE 110 then roams to a VPLMN, registers on the VPLMN and receives allowed NSSAI comprising S-NS-SAI-B and corresponding mapped NSSAI S-NSSAI-A. Under conventional circumstances, the UE 110 may not update the local S-NSSAI associated with the PDU session causing a misalignment between the UE 110 and the network.

To provide another example, consider a scenario where the UE 110 is registered on a VPLMN, has an ongoing PDU session with S-NSSAI-B and corresponding mapped S-NS-SAI as S-NSSAI-A. The UE 110 then returns to the HPLMN, registers on the HPLMN and receives allowed NSSAI with S-NSSAI-A and no corresponding mapped S-NSSAI. Under conventional circumstances, the UE 110 may not update the local S-NSSAI associated with the PDU session causing a misalignment between the UE 110 and the network.

As will be described in more detail below, the exemplary embodiments introduce techniques that are configured to improve the manner in which the UE manages the NSSAI mapping across different PLMNs. For an active PDU session in the UE 110, if the allowed NSSAI contains an HPLMN S-NSSAI (e.g., mapped S-NSSAI, if available) matching to the HPLMN S-NSSAI of the PDU session, the UE 110 shall locally update the S-NSSAI associated with the PDU session to the corresponding S-NSSAI received in the allowed NSSAI. If the allowed NSSAI does not contain an HPLMN S-NSSAI (e.g., mapped S-NSSAI, if available) matching to the HPLMN S-NSSAI of the PDU session, the UE 110 may perform a local release of the PDU session except for an emergency PDU session, if any, and except for a PDU session established when the UE 110 is registered for onboarding services in a standalone non-public network (SNPN), if any.

In some embodiments, the AMF 205 may also determine which PDU session can no longer be supported based on the new allowed NSSAI and it will either indicate in the PDU session status IE which PDU sessions are released locally on the network side or trigger the SMF 210 to initiate a release via 5G session management signaling. In some exemplary embodiments, if the network slice (e.g., S-NSSAI) is no longer available under the same AMF, the AMF indicates to the SMF(s) which PDU Session ID(s) corresponding to the relevant S-NSSAI is to be released and the SMF releases the PDU Session. In other exemplary embodiments, if the network slice (e.g., S-NSSAI) is no longer available upon a change of AMF (e.g., due to Registration Area change), the new AMF indicates to the old AMF that the PDU Session(s) corresponding to the relevant S-NSSAI is to be released. The old AMF informs the corresponding SMF(s) to release the indicated PDU Session(s). Then the new AMF modifies the PDU Session Status correspondingly. The PDU Session(s) context is locally released in the UE after receiving the PDU session Status in the registration accept message.

In another aspect, the exemplary embodiments relate to the UE managing allowed NSSAI for an equivalent PLMN (EPLMN). It has been identified that the UE does not adequately consider TAI belonging to different PLMNs when managing the allowed NSSAI. To provide an example, consider a scenario in which the UE 110 is registered on a HPLMN, has allowed NSSAI and a TAI list containing TAIs belonging to the HPLMN. The UE 110 then receives CUC message containing updated TAI list containing TAIs belonging to different PLMNs which are EPLMNs and there is now new allowed NSSAI. Under conventional circumstances, the UE 110 may not update the allowed NSSAI lists associated with those EPLMNs.

The exemplary embodiments introduce techniques that are configured to improve the manner in which the UE manages the allowed NSSAI for EPLMNs. If the UE 110 receives a new TAI list in the CUC message, the UE 110 may consider the new TAI list as valid and the old TAI list as invalid. Otherwise, the UE 110 may consider the old TAI list as value. If the new TAI list contains TAIs belonging to different PLMNs, which are EPLMNs and if the UE 110 contains allowed locally stored NSSAI, the UE 110 may store the allowed NSSAI in each of the allowed NSSAIs which are associated with each of the EPLMNs. Thus, if the UE 110 containing stored allowed NSSAI receives CUC message with the registration area containing an updated TAI list with different PLMNs, the UE 110 may store the allowed NSSAI in each of the allowed NSSAI lists which are associated with each of the PLMNs.

EXAMPLES

In a first example, a method comprises receiving, from a user equipment (UE), a registration request message including requested network slice selection assistance information (NSSAI) comprising a single-network slice selection assistance information (S-NSSAI), determining whether the UE is allowed to be registered with the S-NSSAI and transmitting, to the UE, a response to the registration request message based on the determining whether the UE is allowed to be registered with the S-NSSAI.

In a second example, the method of the first example, further comprising registering the UE with the S-NSSAI when the UE is allowed to be registered with the S-NSSAI, wherein the response comprises a registration accept message indicating that the S-NSSAI is allowed NSSAI.

In a third example, the method of the first example, wherein the response comprises a registration reject message indicating a cause code for the rejection when the UE is not allowed to be registered with the S-NSSAI.

In a fourth example, a network function configured to perform any of the methods of the first through third examples.

In a fifth example, one or more processors configured to perform any of the methods of the first through third examples.

In a sixth example, a method comprises storing, for a user equipment (UE), allowed network slice selection assistance information (NSSAI) comprising one or more single-network slice selection assistance information (S-NSSAI), determining that at least one of the S-NSSAI is no longer an allowed NSSAI and determining that there is an active protocol data unit (PDU) session active for the at least one S-NSSAI.

In a seventh example, the method of the sixth example, further comprising indicating to a session management function (SMF) of the network that the PDU session is to be released.

In an eighth example, the method of the sixth example, further comprising indicating to the UE that the PDU session is to be released.

In a ninth example, the method of the sixth example, wherein the indicating comprises a registration accept message including a PDU session status information element.

In a tenth example, the method of the sixth example, wherein a network function is a first access and mobility management function (AMF) to which the UE is currently registered, the method further comprising indicating to a second AMF to which the UE was previously registered that the PDU session is to be released.

In an eleventh example, a network function configured to perform any of the methods of the sixth through tenth examples.

In a twelfth example, one or more processors configured to perform any of the methods of the sixth through tenth examples.

In a thirteenth example, performed by a user equipment (UE) comprises identifying that a single-network slice selection assistance information (S-NSSAI) is a configured NSSAI and not an allowed NSSAI, initiating a mobility registration update procedure based on one or more trigger conditions, transmitting a registration request message to a network, the registration request message including requested NSSAI comprising the S-NSSAI, receiving a response to the registration request message, the response indicating that the S-NSSAI is allowed NSSAI and establishing a packet data unit (PDU) session on the S-NSSAI.

In a fourteenth example, the method of the thirteenth example, further comprising receiving, prior to the identifying, a requested NSSAI list from an application processor comprising the S-NSSAI, wherein the requested NSSAI list is received based on a new application, an activated feature or an upper layer request.

In a fifteenth example, the method of the fourteenth example, wherein the one or more trigger conditions comprises detecting that the requested NSSAI list includes a network slice that is configured NSSAI and not allowed NSSAI.

In a sixteenth example, the method of the fourteenth example, wherein the one or more trigger conditions comprises detecting that the allowed NSSAI received from the network at a non-access stratum (NAS) layer does not include a network slice that is not part of the requested NSSAI list received from the application processor at the NAS layer.

In a seventeenth example, the method of the thirteenth example, further comprising receiving, prior to the identifying, a new configured NSSAI list from the network in a configuration update command (CUC) or a registration accept message, wherein the new configured NSSAI is the S-NSSAI.

In an eighteenth example, the method of the seventeenth example, wherein the one or more trigger conditions comprises detecting that the updated configured NSSAI list includes a network slice that was previously requested by upper layers.

In a nineteenth example, the method of the seventeenth example, wherein the one or more trigger conditions comprises detecting that the allowed NSSAI does not include a network slice that is part of the new configured NSSAI list received from the network and that was previously requested by upper layers.

In a twentieth example, the method of the thirteenth example, wherein the one or more trigger conditions comprises detecting that a stored allowed NSSAI list for a public land mobile network (PLMN) includes a number of network slices that is less than a predetermined maximum number of allowed NSSAIs for the PLMN.

In a twenty first example, the method of the thirteenth example, wherein the one or more trigger conditions comprises a UE fifth generation mobility management (5GMM) idle operating mode.

In a twenty second example, the method of the thirteenth example, further comprising starting a timer that is configured to trigger a release N1 non-access stratum (NSA) signaling connection when i) a configuration update command (CUC) includes a new configured NSSAI, ii) user plane resources for a packet data unit (PDU) session have not been set up, iii) no emergency PDU session has been established and iv) the CUC does not include a registration requested bit set to true in the registration requested bit of the configuration update indication information element (IE).

In a twenty third example, the method of the twenty second example, wherein the one or more trigger conditions comprises the expiration of the timer.

In a twenty fourth example, a processor configured to perform any of the methods of the thirteenth through twenty third examples.

In a twenty fifth example, a user equipment configured to perform any of the methods of the thirteenth through twenty third examples.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method performed by a user equipment (UE), comprising:
    transmitting a registration request message to a network, the registration request message comprising a request to register to a set of one or more single-network slice selection assistance information (S-NSSAIs);
    receiving a response to the registration request message, the response indicating that the request to register to the set of one or more S-NSSAIs is rejected;
    storing the set of one or more S-NSSAIs in a rejected NSSAI list locally at the UE;
    performing, after storing the set of one or more S-NSSAIs in the rejected NSSAI list, an inter-radio access technology (IRAT) transition from N1 mode to S1 mode; and
    deleting the set of one or more S-NSSAIs from the rejected NSSAI list in response to the IRAT transition.

2. The method of claim 1, further comprising:
    receiving, after storing the set of one or more S-NSSAIs in the rejected NSSAI list, an indication of a network slice subscription change for the UE; and
    deleting the set of one or more S-NSSAIs from the rejected NSSAI list in response to the indication of the network slice subscription change.

3. The method of claim 1, further comprising:
    receiving, after storing the set of one or more S-NSSAIs in the rejected NSSAI list, a configuration update command (CUC) with a registration requested bit of a configuration update indication information element (IE) set to a first value; and
    deleting the set of one or more S-NSSAIs from the rejected NSSAI list in response to the CUC.

4. The method of claim 3, wherein the CUC contains no other parameters.

5. The method of claim 1, further comprising:
    entering, after storing the set of one or more S-NSSAIs in the rejected NSSAI list and an unsuccessful registration on a new public land mobile network (PLMN), a fifth generation mobility management (5GMM) registered mode;
    deleting the set of one or more S-NSSAIs from the rejected NSSAI list in response to detecting the 5GMM registered mode and detecting that the UE is not registered with a current PLMN over another access.

6. An apparatus comprising a memory coupled to a processing circuitry, the processing circuitry configured to:
    generating, for transmission to a network, a registration request, the registration request message comprising a request to register to a set of one or more single-network slice selection assistance information (S-NSSAIs);
    processing, based on signaling received from the network, a response to the registration request message, the response indicating that the request to register to the set of one or more S-NSSAIs is rejected;
    storing the set of one or more S-NSSAIs in a rejected NSSAI list locally at the UE;
    performing, after storing the set of one or more S-NSSAIs in the rejected NSSAI list, an inter-radio access technology (IRAT) transition from N1 mode to S1 mode; and
    deleting the set of one or more S-NSSAIs from the rejected NSSAI list in response to the IRAT transition.

7. The apparatus of claim 6, the processing circuitry further configured to:
    processing, based on signaling received from the network after storing the set of one or more S-NSSAIs in the rejected NSSAI list, an indication of a network slice subscription change for the UE; and
    deleting the set of one or more S-NSSAIs from the rejected NSSAI list in response to the indication of the network slice subscription change.

8. The apparatus of claim 6, the processing circuitry further configured to:
    processing, based on signaling received from the network after storing the set of one or more S-NSSAIs in the rejected NSSAI list, a configuration update command (CUC) with a registration requested bit of a configuration update indication information element (IE) set to a first value; and
    deleting the set of one or more S-NSSAIs from the rejected NSSAI list in response to the CUC.

9. The apparatus of claim 8, wherein the CUC contains no other parameters.

10. The apparatus of claim 6, the processing circuitry further configured to:
    entering, after storing the set of one or more S-NSSAIs in the rejected NSSAI list and an unsuccessful registration on a new public land mobile network (PLMN), a fifth generation mobility management (5GMM) registered mode;
    deleting the set of one or more S-NSSAIs from the rejected NSSAI list in response to detecting the 5GMM registered mode and detecting that the UE is not registered with a current PLMN over another access.

11. A non-transitory computer readable storage medium comprising a set of instructions, wherein the set of instructions when executed by a processor cause the processor to perform operations, comprising:
    generate, for transmission to a network, a registration request, the registration request message comprising a request to register to a set of one or more single-network slice selection assistance information (S-NSSAIs);

process, based on signaling received from the network, a response to the registration request message, the response indicating that the request to register to the set of one or more S-NSSAIs is rejected;

store the set of one or more S-NSSAIs in a rejected NSSAI list locally at the UE;

perform, after storing the set of one or more S-NSSAIs in the rejected NSSAI list, an inter-radio access technology (IRAT) transition from N1 mode to S1 mode; and delete the set of one or more S-NSSAIs from the rejected NSSAI list in response to the IRAT transition.

12. The non-transitory computer readable storage medium of claim 11, further configured to:

process, based on signaling received from the network after storing the set of one or more S-NSSAIs in the rejected NSSAI list, an indication of a network slice subscription change for the UE; and delete the set of one or more S-NSSAIs from the rejected NSSAI list in response to the indication of the network slice subscription change.

13. The non-transitory computer readable storage medium of claim 11, further configured to:

process, based on signaling received from the network after storing the set of one or more S-NSSAIs in the rejected NSSAI list, a configuration update command (CUC) with a registration requested bit of a configuration update indication information element (IE) set to a first value; and delete the set of one or more S-NSSAIs from the rejected NSSAI list in response to the CUC.

14. The non-transitory computer readable storage medium of claim 13, wherein the CUC contains no other parameters.

15. The non-transitory computer readable storage medium of claim 11, the further configured to:

enter, after storing the set of one or more S-NSSAIs in the rejected NSSAI list and an unsuccessful registration on a new public land mobile network (PLMN), a fifth generation mobility management (5GMM) registered mode;

delete the set of one or more S-NSSAIs from the rejected NSSAI list in response to detecting the 5GMM registered mode and detecting that the UE is not registered with a current PLMN over another access.

* * * * *